United States Patent [19]

Prader

[11] Patent Number: 4,665,680
[45] Date of Patent: May 19, 1987

[54] METHOD OF MAKING EXTRUDED PLASTIC HOLDER FOR HANDLED BAGS

[75] Inventor: Randolph D. Prader, Fairport, N.Y.

[73] Assignee: Mobil Oil Corporation, New York, N.Y.

[21] Appl. No.: 837,637

[22] Filed: Mar. 10, 1986

Related U.S. Application Data

[62] Division of Ser. No. 670,443, Nov. 13, 1984, abandoned.

[51] Int. Cl.$^4$ ............................................. B65B 67/00
[52] U.S. Cl. ....................................... 53/411; 53/175; 53/390; 493/287; 493/293; 493/924
[58] Field of Search .......................... 248/95, 99, 100; 141/390; 53/390, 175, 411; 493/293, 288, 287, 270, 211, 239, 226, 926, 924

[56] References Cited

U.S. PATENT DOCUMENTS

| | | | |
|---|---|---|---|
| 3,738,482 | 6/1973 | Cwikla | 248/100 X |
| 3,994,209 | 11/1976 | Jacob | 493/188 X |
| 4,014,157 | 3/1977 | Pearce | 53/390 X |
| 4,027,774 | 6/1977 | Cote | 248/99 X |
| 4,280,315 | 7/1981 | Von Hapsburg | 53/390 X |
| 4,280,676 | 7/1981 | Betts | 248/99 X |
| 4,457,483 | 7/1984 | Gagne | 248/99 X |

Primary Examiner—James F. Coan
Attorney, Agent, or Firm—Alexander J. McKillop; Michael G. Gilman; Charles J. Speciale

[57] ABSTRACT

An extruded cylinder of plastic material having open ends and die-cut flaps on opposite sides is a supporting holder for limp plastic bags. The holder is formed by an inexpensive process of extruding plastic and cutting the tube into cylinders of the proper length and simultaneously die-cutting the flaps in the sides of the cylinder. The holder is flattened during manufacture and packaged in the flattened condition.

7 Claims, 6 Drawing Figures

METHOD OF MAKING EXTRUDED PLASTIC HOLDER FOR HANDLED BAGS

This is a divisional of copending application Ser. No. 670,443, filed on Nov. 13, 1984 and now abandoned.

BACKGROUND OF THE INVENTION

This invention relates to holders for supporting limp plastic bags having carrying handles, and more particularly to an inexpensive holder which can be used in conjunction with the bags as a trash holder.

Thin film plastic bags are now extensively used for carrying groceries and as trash containers. U.S. Pat. No. 4,165,832-Orem and Kuklies shows a thin film bag with carrying handles which has been successfully used for carrying groceries. Since these plastic bags are very limp, during loading they must be supported by a holder U.S Pat. No. 4,062,170, Orem shows a holder suitable for use in a grocery store during bagging of the groceries. The handles of the plastic bag are looped over elongated tabs on the holder to support the bag during loading. Such holders are well suited for grocery store use where durability over extensive use is a consideration. This type of holder is not suitable for home use where inexpensive initial cost is the principal consideration.

Holders for supporting plastic trash bags for use in the home have been proposed. U.S. Pat. Nos. 3,905,406, Cruz; 3,838,839, Spencer; and 3,260,488, Kliewer, et al are typical. These prior art holders do not have the combination of low initial cost, reliable, easy use and attractiveness which is desirable for home use.

It is an object of the present invention to provide a low cost, durable, holder for handled plastic bags.

It is another object of the present invention to provide a plastic holder which can be easily manufactured in plastic extruding process.

SUMMARY OF THE INVENTION

In accordance with the present invention, a supporting holder for limp plastic bags having carrying handles includes an extruded cylinder of plastic material. The cylinder has open ends and a diameter and height which accommodate the bags. Each cylinder has die-cut flaps on each side of the cylinder. These flaps have a shape which accommodates the handles to support one of the bags in the cylinder. The material, length, and diameter of the cylinder impart load carrying rigidity to each cylinder in the lengthwise direction, but each cylinder is flexible in the radial direction.

During manufacture, a continuous tube of plastic material is extruded and flattened so that it can be easily cut to the proper length and the flaps can be die-cut into the extruded tube of plastic.

Because of this manufacturing technique, the holder of the present invention has an extremely low cost, for example, approximately $.50 to a $1.50 each. The plastic material from which the holder is made can be embossed with an attractive design making it further desirable for home use. The holder can be used as a free-standing trash container, or it can be used as an insert for conventional trash containers which is thereby adapted to use with plastic bags.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 2:
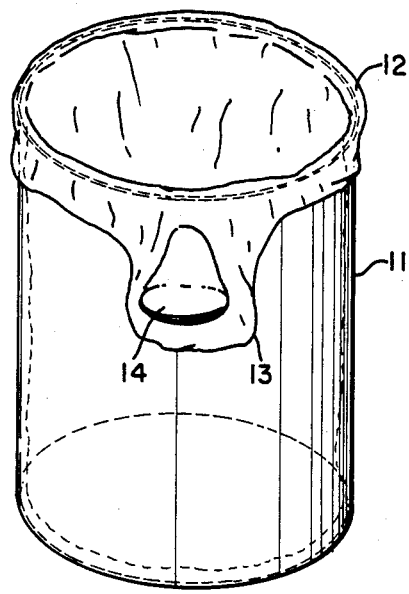
FIG. 2 shows the holder with a handled bag in place suitable for use in receiving trash.
Figure 1:
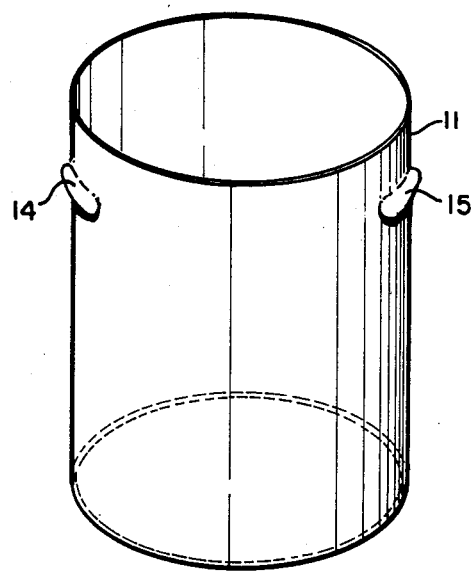
FIG. 1 shows the holder of the present invention.

FIGS. 1 and 2 show a supporting holder 11 for limp plastic bags 12 having oppositely disposed carrying handles, one of which is shown at 13. The holder is an extruded cylinder of plastic material having open ends and a diameter and height which accommodates the bags. Flaps 14 and 15 are die-cut on opposite sides of the cylinder. The flaps can be pushed outwardly so that the handles of the bag can be looped over the flaps to support the bags.

In the preferred embodiment, the flap is a partial oval which is interrupted at the top by uncut plastic which joins the flap to the cylinder. This oval shape provides a good fit for the bag handle.

The material, length and diameter of each cylinder impart bag load carrying rigidity to each cylinder in the lengthwise direction. In the radial direction the cylinder is flexible. It can be flattened during manufacture and can be packaged in a flattened condition which makes it particularly suitable for shipping and distributing in retail outlets. A holder in a flattened condition can be conveniently packaged for marketing in conjunction with a pack of plastic bags of the type shown in the aforementioned Kuklies and Orem patent.

An exemplary embodiment of the invention is extruded from polyethylene plastic with a thickness of 0.01 to 0.02 inches, a 20 inch diameter, by 16 inches in length, with protruding flaps 3 to 6 inches from the top.

Figure 3:
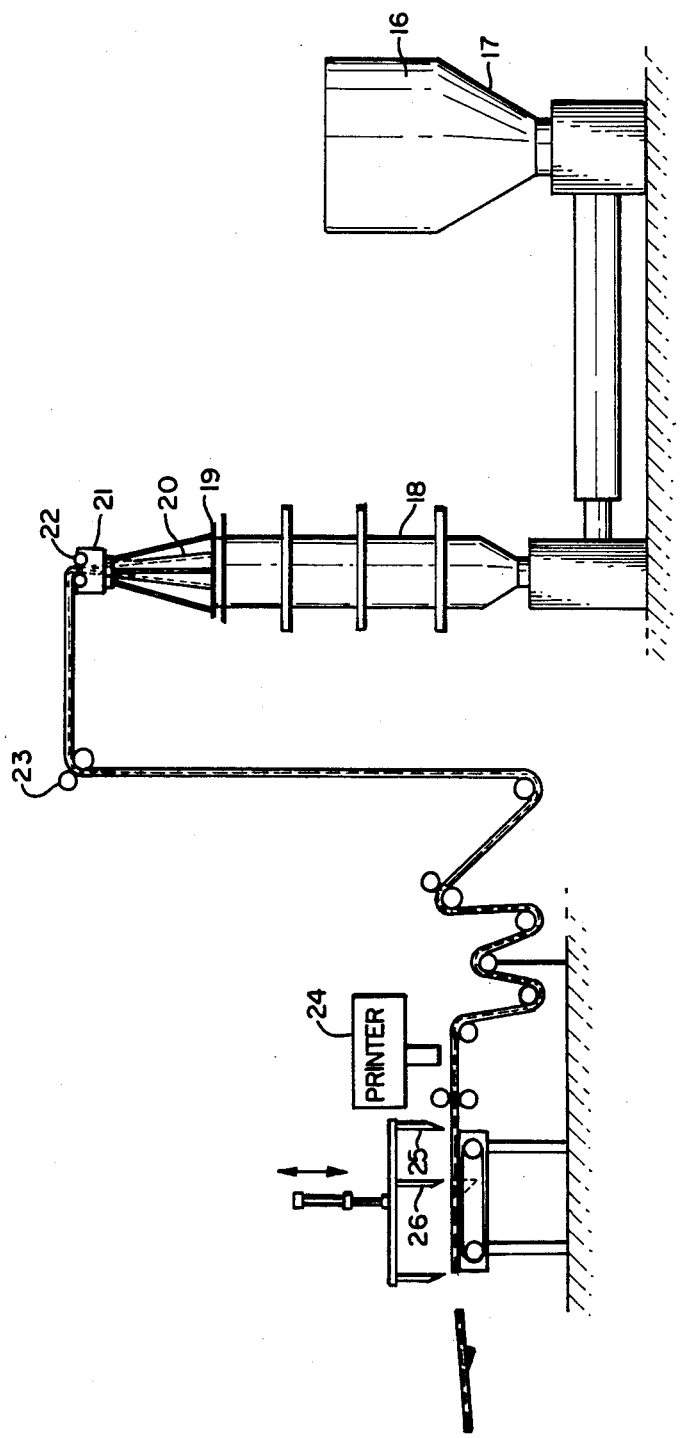
FIG. 3 depicts the manufacture of the holder of the present invention.

FIG. 3 depicts the manner of manufacturing the holders of the present invention. Raw plastic stock 16 is fed into a hopper 17, is heated and forced by an extruder assembly 18 through a circular die ring 19 to form a continuous tubular column 20 of extruded thermoplastic. The tube is collapsed by a collapsing tower structure 21 and a pair of pinch rollers 22 at the top of the column and drawn off by the pinch rollers 23. Alternatively, a substantially horizontal extruding process can be used.

The extrusion of a thermoplastic tube in accordance with the invention, is similar to the process which is used in the manufacture of the plastic bags themselves. The extruding die is different so that the thickness of the extruded tube is approximately 0.01 to 0.02 inches rather than the much thinner film extruded in the manufacture of the bags. An attractive pattern is applied to the flattened tube of plastic by the printer 24.

The flattened tube of plastic is cut into cylinders, each having a length which will accommodate one bag, by the cutting die 25. Simultaneously, cutting die 26 is lowered to cut the tabs in the sides of the cylinder.

In this manner, an inexpensive, reliable, attractive holder for plastic bags is fabricated.

Figure 4:
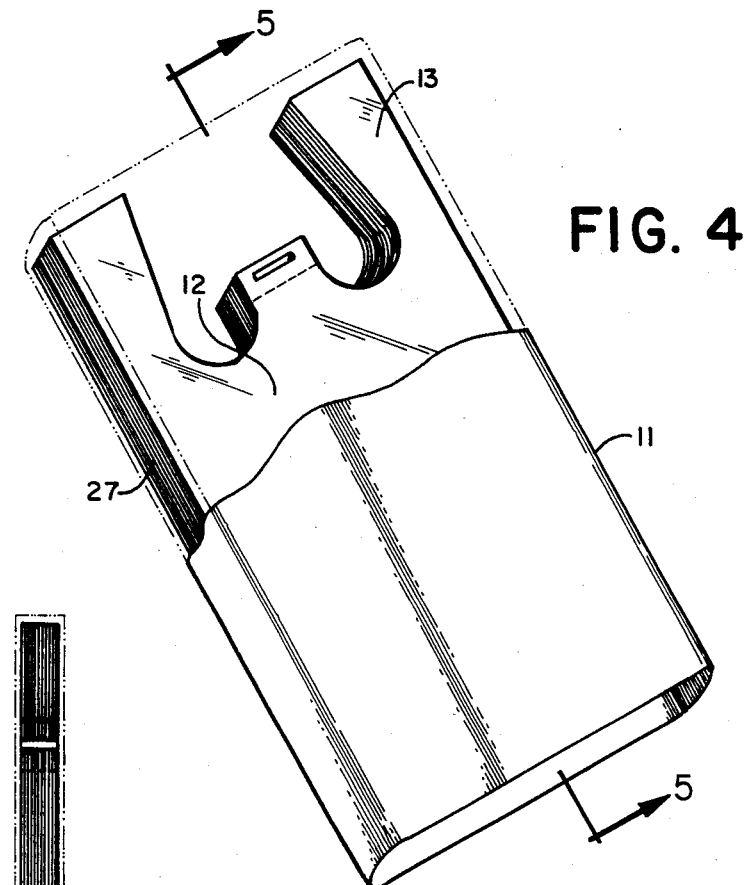
FIG. 4 depicts a holder and pack of bags packaged for marketing.
Figure 5:
FIG. 5 is a section on the line 5—5 of FIG. 4.

Typically, the cylinders are packaged for shipping and sale in the flattened condition. FIGS. 4 and 5 depict a pack 27 of handled plastic bags 12 packaged within the flattened cylinder 11 which forms the holder of the present invention.

Figure 6:
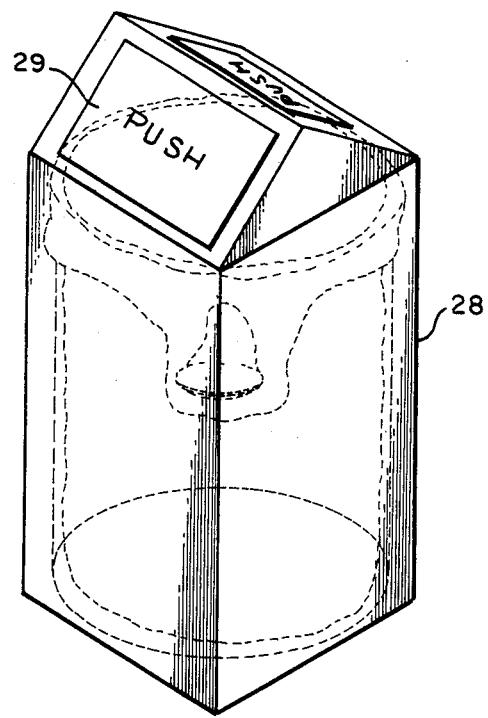
FIG. 6 shows the holder of the invention used as an insert for a conventional trash container.

FIG. 6 shows the holder of the present invention used as an insert in a conventional trash container 28 of the type having a hinged lid 29. This adapts the container for use with plastic bags which can be easily discarded when filled.

While a particular embodiment of the invention has been shown and described, various modifications are within the true spirit and scope of the invention. The appended claims are, therefore, intended to cover all such modifications.

What is claimed is:

1. A method of making a supporting holder for limp plastic bags having carrying handles comprising:
   extruding a tube of plastic material of a uniform diameter which will accommodate one of said bags, said tube having a substantially uniform wall thickness of from about 0.01″ to about 0.02″;
   cutting said tube into cylinders each having open ends and a length which will accommodate one of said bags, the material, length, and diameter of each cylinder imparting bag load carrying rigidity to each cylinder in the lengthwise direction, each cylinder being flexible in the radial direction; and
   die-cutting flaps on opposite sides of said cylinder, said flaps being cut in the wall of said cylinder and having the same uniform thickness as the wall of said cylinder, said flaps having a shape which accommodates said handles to support one of said bags in said cylinder.

2. The method recited in claim 1 further comprising: flattening said tube of plastic material after extruding and before cutting.

3. The method recited in claim 2 further comprising; simultaneously die-cutting both flaps in said cylinder while they are flattened.

4. The method recited in claim 2 further comprising: simultaneously cutting said tube into cylinders and die-cutting the flaps in the sides of said cylinders while they are flattened.

5. The method recited in claim 2 further comprising: printing a pattern on each cylinder while it is flattened.

6. The method recited in claim 2 further comprising: packaging said cylinders for shipment and marketing while they are flattened.

7. The method recited in claim 6 further comprising: packaging said cylinders with a pack of said bags for marketing.

* * * * *